Figure 1:
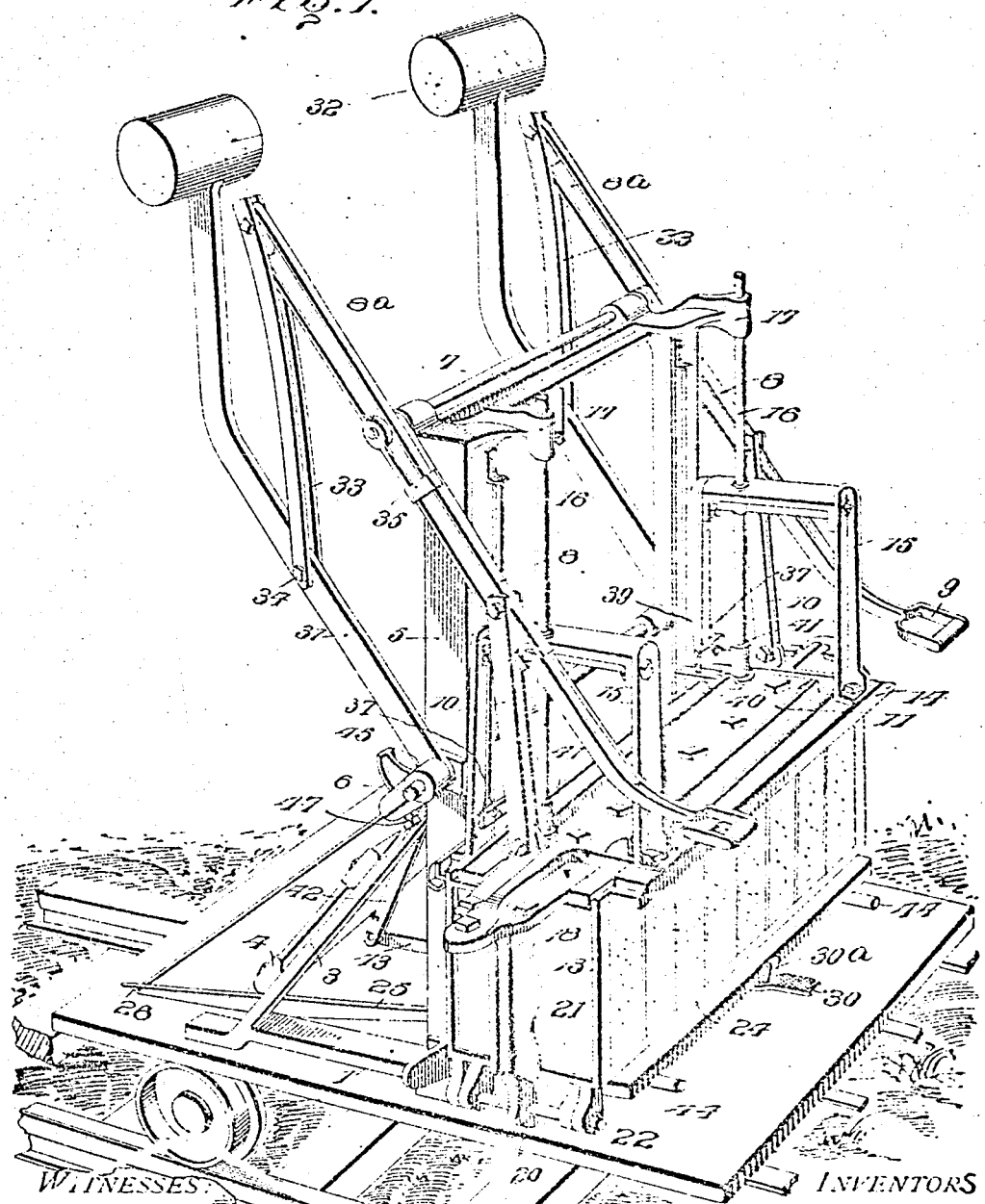

No. 895,414.

PATENTED AUG. 11, 1908.

R. B. & W. W. BENNETT.
BLOCK MOLDING MACHINE.
APPLICATION FILED OCT. 5, 1907.

4 SHEETS—SHEET 1.

WITNESSES

INVENTORS
R. B. Bennett.
W. W. Bennett.
Attorneys

No. 895,414. PATENTED AUG. 11, 1908.
R. B. & W. W. BENNETT.
BLOCK MOLDING MACHINE.
APPLICATION FILED OCT. 5, 1907.
4 SHEETS—SHEET 2.
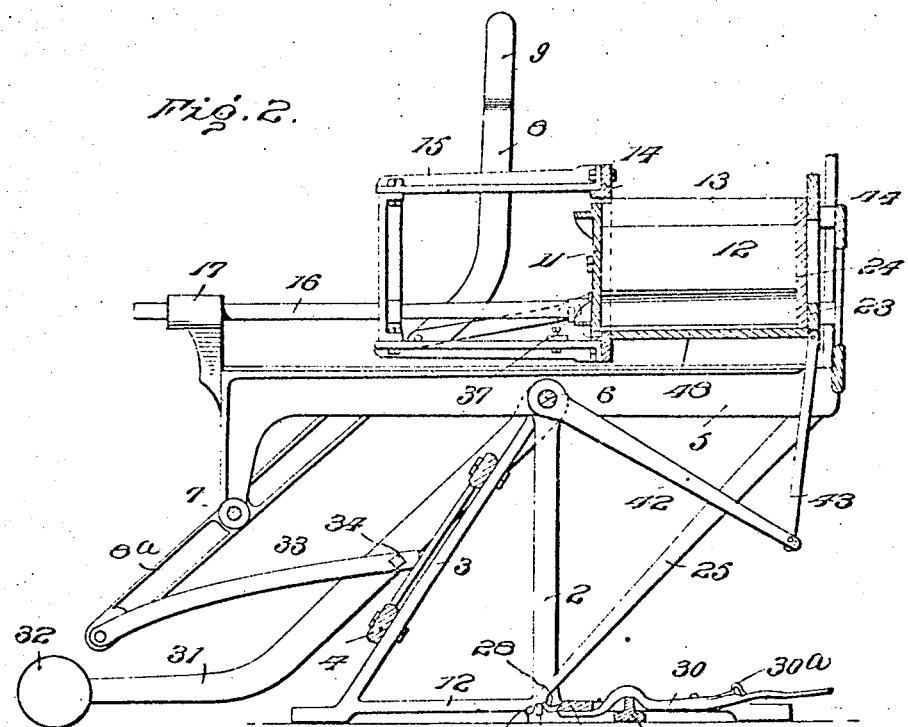
Fig. 2.
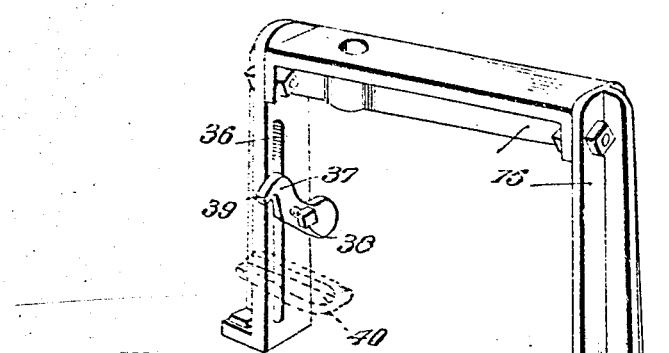
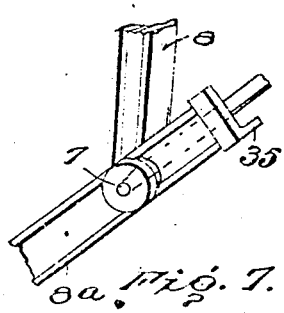
Fig. 7.
WITNESSES:
INVENTORS
R. B. Bennett.
W. W. Bennett.
Attorneys

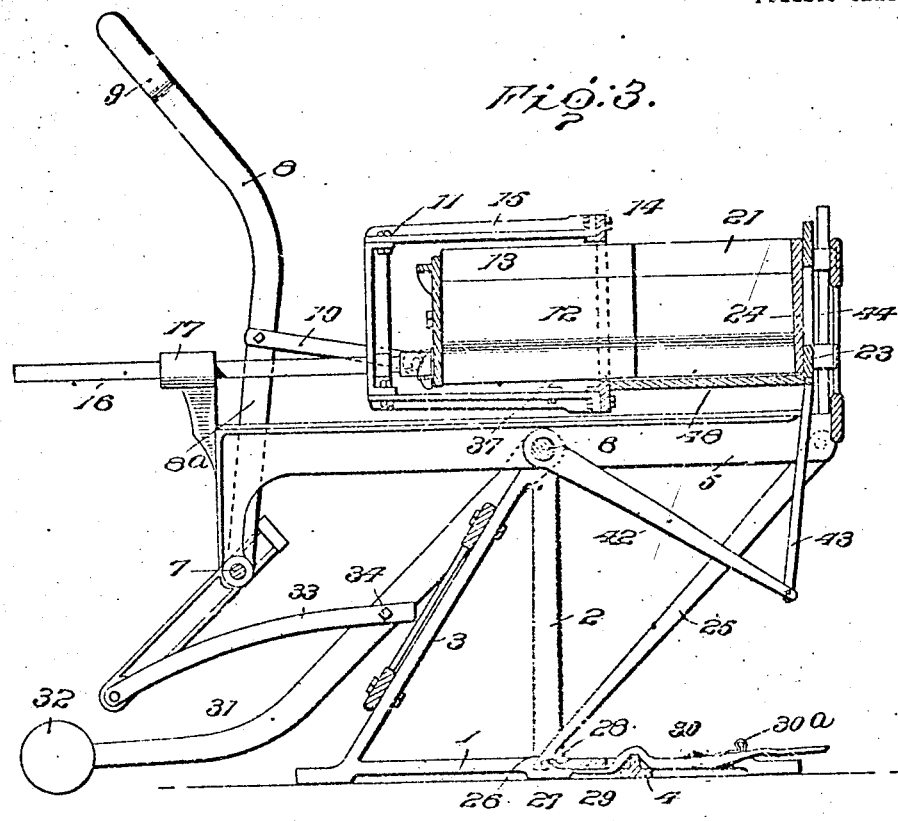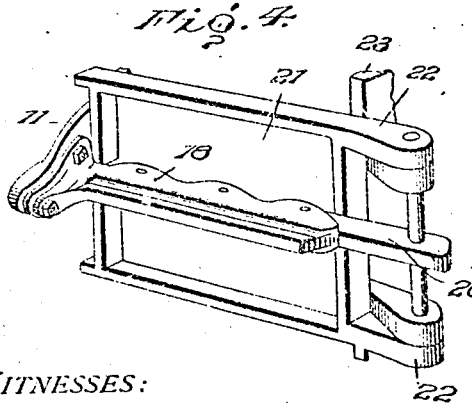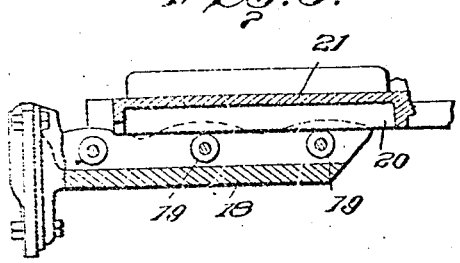

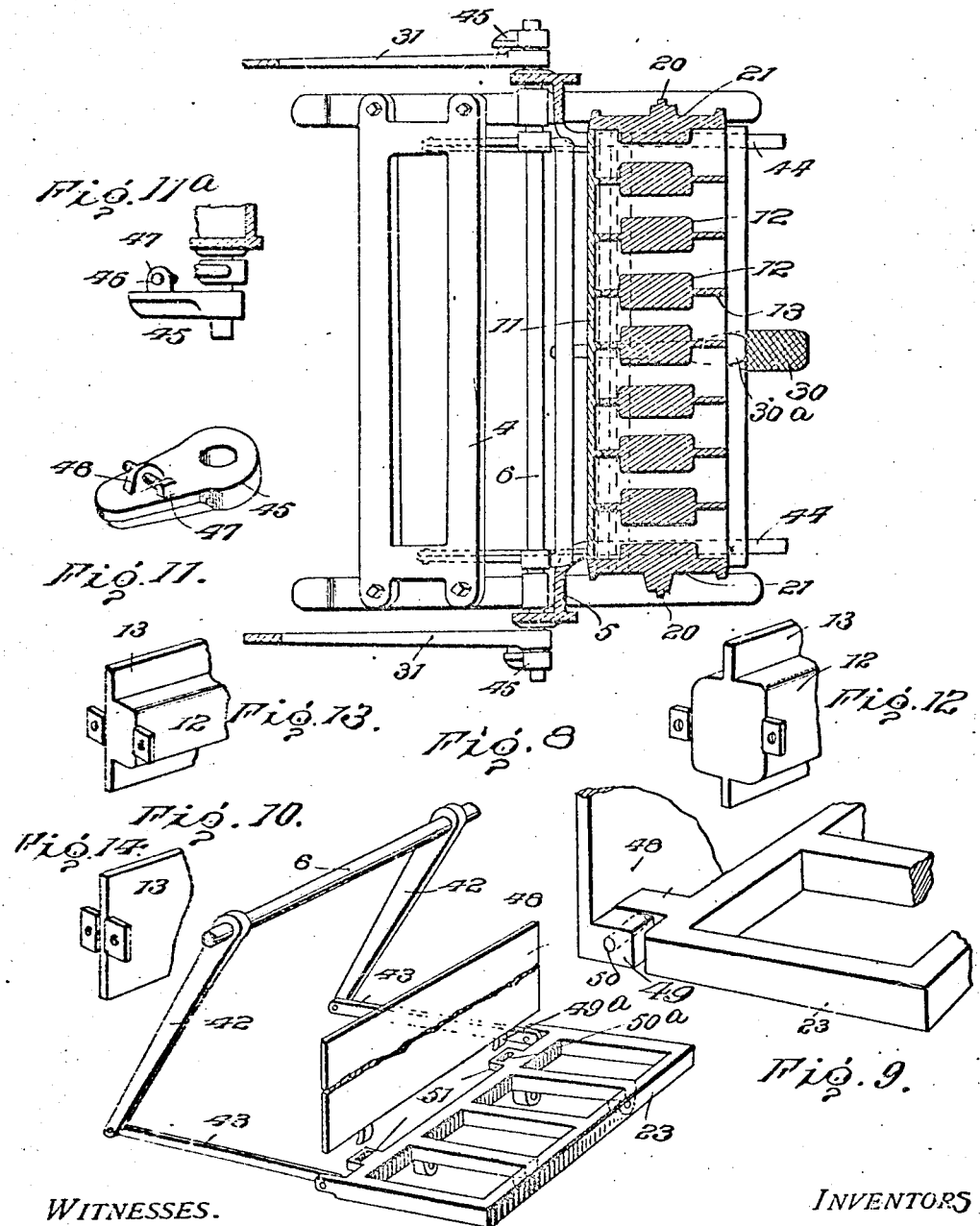

UNITED STATES PATENT OFFICE.

RUSSELL B. BENNETT AND WILLIAM W. BENNETT, OF WESTERVILLE, OHIO.

BLOCK-MOLDING MACHINE.

No. 895,414.    Specification of Letters Patent.    Patented Aug. 11, 1908.

Application filed October 5, 1907. Serial No. 396,107.

*To all whom it may concern:*

Be it known that we, RUSSELL B. BENNETT and WILLIAM W. BENNETT, citizens of the United States, residing at Westerville, in the county of Franklin and State of Ohio, have invented certain new and useful Improvements in Block-Molding Machines, of which the following is a specification.

This invention comprehends certain new and useful improvements in machines for forming concrete blocks, and the invention has for its primary object a machine of this character which will be practically automatic and actuated by gravity and one in which the force or work required to shovel the material into the machine is stored up and utilized in the operation of the same.

The invention also has for its object a machine of this character in which the entire mold and its supporting frame is mounted to tilt upon an elevated axis in such a manner as to maintain the mold parts always in the same relative position so as to insure a perfect block at each delivery. And a further object of the invention is to provide a machine of this type which will be composed of comparatively few and simple parts that may be readily assembled and that will be durable in construction and efficient in operation, and in which the parts are so balanced that the mold will be moved from its tilting position to its discharging position by the action of gravity, which will deliver its contents in completed condition by the action of gravity, when the parts are released by the operator, and which will then automatically move back to the tilting position, ready for a succeeding operation.

With these primary objects in view and with other objects in view as will hereinafter more fully appear as the description proceeds, the invention consists in certain constructions, arrangements and combinations of the parts that we will hereinafter describe and then point out the novel features and combinations thereof in the appended claims.

For a full understanding of the invention, reference is to be had to the following description and accompanying drawings, in which:

Figure 1 is a perspective view of our improved gravity actuated mold; Fig. 2 is a transverse sectional view, with the mold in the position it assumes when the block is completed; Fig. 3 is a similar view with the parts in readiness to receive the material; Fig. 4 is a detail perspective view of one of the end doors of the mold; Fig. 5 is a detail horizontal sectional view thereof; Fig. 6 is a detail perspective view of one of the stirrups of the stripper back; Fig. 7 is a detail perspective view of the joint between the jointed levers; Fig. 8 is a horizontal sectional view of the mold; Fig. 9 is a detail perspective view of a portion of one form of pallet supporting carriage; Fig. 10 is a similar view of another embodiment of said carriage; Figs. 11 and 11ª are detail views of one of the tappet arms; Fig. 12 is a detail view of one form of core and division board combined, illustrating the means by which such parts may be detachably connected to the core back; Fig. 13 is a similar view of a half core with a division board formed therewith; Fig. 14 is a detail view of a division board arranged for connection to the core-back and designed to be used without the core; and, Fig. 15 is a detail sectional view illustrating the joint between the stripper back and the end doors hereinafter specifically referred to.

Corresponding and like parts are referred to in the following description and indicated in all the views of the drawings by the same reference characters.

The molding machine of our invention comprises a supporting base or stand embodying two standards, each of which, in the present instance, consists of a foot portion 1, an upwardly extending leg 2, and a brace 3 connecting the leg and foot portion. Spreaders or cross braces 4 connecting the two standards together at the proper point to produce a substantial and sufficiently rigid structure.

The mold supporting frame comprises sills or side rails 5 that are pivotally mounted intermediate of their ends and preferably nearer one end than the other, on the horizontally extending axis or shaft 6 journaled to rotate in the upper ends of the standards. A transversely extending fulcrum rod 7 is mounted at one end of the mold supporting frame and hand levers 8 are fulcrumed at one end on said fulcrum rod. The hand levers may be provided at their opposite ends with any desired form or construction of grips 9.

Links 10 connect the hand levers 8 with the core-back 11, preferably near the ends of the latter, and said core-back carries the preferably removable and adjustable cores 12, and the preferably removable and adjustable division boards 13 that are rigidly secured to the core-back in any desired way after the desired adjustment has been effected, according to the number and widths of blocks that it is desired to mold at the one operation. Obviously fractional size blocks may be made with ease, uniformity, and rapidity, the same as the regular sized block, thereby producing the broken ashlar effect so much desired by architects.
14 designates the stripper back of the mold which is provided at its ends with the preferably rectangular stirrups 15 and guide rods 16 are secured to the core-back 11, and are mounted to move longitudinally in the guide bearings 17 that in the present instance are formed as collars extending from one end of the respective side rails 5 of the mold supporting framework. The core-back 11 has latch arms 18 secured thereto near its ends, said latch arms being preferably provided with rollers 19 designed to engage the flanges 20 on the respective end doors 21 of the mold, so that as the hand levers 9 are rocked forwardly and the core back is thus carried against the outer or rear face of the stripper back, to pass the cores, or the cores and division boards into the mold, these latch arms will be carried into engagement with the flanges of the doors and securely hold the doors in closed position. The doors 21 may be provided with knuckles 22 through which a pintle may extend so as to hinge the door to corresponding knuckles on the frame-like or skeleton carriage 23 that is designed to support and carry the removable pallet 24.

In its elevated position, ready to receive its contents, the mold is securely supported by means of one or two struts 25 that are pivotally suspended from the side rails 5 and that are formed at their ends with feet 26 designed for engagement with lugs 27 projecting inwardly from the respective legs 2 of the standards.

28 designates trips that are designed to disengage the struts from the lugs 27, said trips being preferably carried on the outer ends of a transversely extending bar 29. The said bar is secured intermediate of its ends to the releasing lever 30 which, in the present instance, is in the form of a foot treadle formed in its lower edge with a socket by which it is detachably fulcrumed on one of the spreaders 4 of the supporting stand. By depressing the outer free end of the lever 30, it is obvious that the struts may be disengaged from the lugs 27 so as to no longer support the weight of the filled mold. By mounting the releasing lever 30 removably, it may be taken out of the way, together with the releasing bar 29, so that clear access may be had underneath the machine for the purpose of cleaning or the like.

Counterbalancing arms 31 are freely pivoted at one end on the outer ends of the shaft 6 and extend rearwardly, as shown, and the weights 32 are carried on the outer ends of said arms. Links 33 are connected at one end at the points 34 to the counterbalancing arms 31 and the other ends of said links are connected to the outer ends of extension members 8$^a$ of the levers 8 said extension members having a limited joint connection with the hand levers, such connection, in the present instance being effected by mounting the extension members 8$^a$ on the ends of the fulcrum rod 7, one end of each extension member overlapping the corresponding end of its respective lever 8 and being provided with a lug 35 with which such lever 8 is designed to engage when moved a predetermined distance in one direction, so that the continued movement of the two hand levers in such direction will effect a coincident movement of the extension members 8$^a$. It will be noted, however, that the hand levers 8 have a certain movement independently of the extension members 8$^a$.

When the mold is empty, the weight of the counterbalancing arms 31 and such parts of the mold supporting frame to the rear of the axis or shaft 6, together with the other related parts, is sufficient to hold the mold in the elevated position illustrated in Fig. 3. This is the position in which the mold is in readiness to receive its contents. In operation, the rich facing is first placed in the mold and the coarser material used for the main body of the block is tamped directly on the facing. When making the regular sized block, the latch arms 18 are moved until their outer rollers clamp the end doors 21 against the stripper back to lock the mold closed while the cores are still out of the mold, and the block is then tamped up to a predetermined point in the mold, after which the hand levers 8 are drawn further forwardly so as to insert the cores, and the block is finished. In making the small blocks, the facing is placed in the machine, the division boards or plates 13 are drawn forwardly with cores 12 by the manipulation of the hand levers 8 and the coarser material is then delivered into the mold and tamped to the facing through the spaces between the cores, the tamping being continued until the block is finished.

It is to be understood that the parts are so balanced on the axis or shaft 6 that the weight of the completed mold will overbalance those movable parts of the machine that are to the rear of the axis 6 when the mold is finished. To hold the mold elevated until it is desired to tilt the frame and discharge the completed produce, the struts 25, hereinbefore described, are provided.

When the block is finished, the operator merely places his foot upon the releasing lever 30 and presses the same, thereby disengaging the struts from their lugs 27, and thereby permitting gravity, or the weight of the mold itself with the completed block, which constitutes the power, to operate the machine. The travel of the weights 32, the different positions they assume, and the combined movement of the compound levers composed of the counterbalance arms 31, links 33, and levers 8ª, are such that the block is almost on a perfect balance at any point in its traverse from the position shown in Fig. 2 when just completed, to the position at right angles thereto, as shown in Fig. 1, just preparatory to the automatic opening of the mold, and the delivery of the completed block or blocks. In other words, very little, if any, assistance to the action of gravity is necessary to turn the block over after the operator has released the mold from its elevated position, and it is obvious that it is within the purview of our invention to so arrange the parts that the mold will of itself lower and turn over, to the discharging position illustrated in Fig. 1, as soon as the operator depresses the releasing lever 30. In the delivery position, it is noted (see Fig. 1) that the catch or detent 30ª of the releasing lever 30 automatically engages a portion of the mold so as to lock the machine in such a position until the block is turned over on its pallet, and the cores and divisions, or both are pulled vertically from the machine, while the mold parts are still in contact. In this connection, it is to be remarked, and will be clear that by the combination used, the withdrawal of the cores is not limited to this vertical position, nor to any one position of the mold, as heretofore practiced before our invention, and that the cores or (and) division boards may be withdrawn in whole, or in part, from any position on the mold, to wit, from a horizontal to the vertical, and that this withdrawal may be automatically effected at any desired point during the movement of the mold. To accomplish this, one member of either or both stirrups 15 may be formed with a longitudinal slot 36 in which a dog 37 is pivotally held by means of the adjustable clamping bolt 38, the hooked end 39 of the dog being designed to engage a finger 40 projecting out from the core-back 11. As the mold supporting frame tilts from its initial horizontal position towards its discharging vertical position, it is obvious that the weight of the mold will cause the latter to draw away from the core-back until the dog, or dogs, 37 shall have engaged the finger, or fingers, 40 of the core-back, whereupon the core-back will be compelled to move with the mold. By the adjustable mounting of the said dogs, this relative or independent movement of the mold or those parts thereof that support the completed product, may be varied, so as to effect a complete or partial withdrawal or stripping of the cores and (or) division boards. This stripping of the cores and division boards from the mold while the block is being turned over is accomplished without the assistance of the operator by the power herein utilized, namely, the weight of the block itself and the counterbalancing effect of the weights.

In further explanation of the action of the dogs 37, it should be stated that those arms of the stirrups that carry the dogs 37 lie horizontal when the mold is in its initial receiving position. After the parts of the mold have been completely closed, the dogs 37 are set cross wise of the arms which carry them so that their hooked ends will lie in the path of the fingers 40 of the core-back. It is to be understood that the withdrawal of the mold from the core-back, or the relative independent movement of the latter takes place when the mold is being swung from the horizontal to the vertical position, but so soon after it has left its elevated horizontal position that the fingers 40 will engage with the hooks of the dogs 37 before the said dogs shall have assumed a position where their weighted ends will swing them out of the way of the fingers. Thus, the engagement between the fingers and the hooked ends of the dogs will be effected properly and they will obviously be kept in engagement until a slight downward pressure upon the hand grips 9 upon the levers 8 will move the core-back 11 slightly in a downward direction to permit gravity to release the dogs 37 from the fingers 40. In the movement of the mold from its elevated receiving position to its lowered delivering position, the latch arms will obviously release the end doors of the mold, but it is to be understood that the proportions of the parts are such that the said latch arms will maintain engagement with the flanges of the doors and hold them closed upon the outward movement of the core-back, until the cores are withdrawn entirely from the mold.

The invention has now been described to the point where the mold is in readiness to be opened and the complete product delivered therefrom. The mold parts are in the position illustrated in Fig. 1, and just described, it is obvious that when the block is in the position illustrated in such view, the core-back may be in a relatively elevated position to a predetermined degree. By a slight downward pressure upon the hand grips 9 of the levers 8, gravity will release the adjustable dog, or dogs 37, and the weights 32 will commence to travel downwardly. During this travel of the weights, the core-back 11 is raised until the bosses 41 of its guide rods 16 strike the upper cross-bars of the stirrups 15. This will limit the independent upward movement of the core-back (to which is secured the cores or division boards, or both), and the continued downward movement of the weights will then raise the stripper back 14 from the block, open the end doors, and move the block outwardly from the machine in readiness to be carried away on the pallet 24. The end doors 21 are opened positively on account of their beveled joint with the stripper back 14, as illustrated in Fig. 15. From this view, it will be seen that as the stripper back 14 moves outwardly, its beveled ends will have a cam action on the outer ends of the doors and thereby positively swing the same in an outward direction. The mechanism for delivering the completed block comprises the crank arms 42 which are rigidly secured to the shaft 6, preferably between the standards, as shown, and which are connected by the pitmen 43 to the skeleton carriage 23. This carriage is mounted to slide on the shafts 44, suitably connected to the side rails 5 of the mold supporting frame. Tappet arms 45 are rigidly secured to the outer ends of the shaft 6 in juxtaposition to the pivoted ends of the counterbalance arms 31 and the latter, in their downward movement, are designed to strike the lugs 46 of the tappet arms so as to rotate the axis or shaft 6 thereof, swing the crank arms 42, and move the carriage 23 outwardly to deliver the block. This delivery is made adjustable by means of set screws 47 in the lugs 46 of the respective tappet arms 45. As the carriage 23 with the pallet on it moves outwardly, as described, the face plate 48 of the mold tilts rearwardly, so that the block is now freed on all sides, except one and is in readiness to be removed on the pallet 24.

In one arrangement of the parts, the face plate 48 is provided with projections 49 formed with sockets that receive the horizontally extending studs 50 projecting from the vertical lugs of the carriage 23. As the face plate 48 is thus mounted with its greater weight below the center of the pins 50, gravity causes the said face plate to tilt backwardly from the face of the block and rest as a support on its angular edge, as soon as the carriage has moved outwardly.

As a modified form of mounting for the face plate, reference is to be had to Fig. 10 from which it will be seen that the face plate may be provided with projections 49ª in the nature of dowels designed to rest loosely in sockets 51 of the carriage 23, so as to tilt backwardly when the carriage is moved outwardly.

The operator may now release the mold supporting frame from its delivering position, by again depressing the lever 30 so as to release the detent 30ª, whereupon the greater weight of the counterbalancing arms 31 and their related parts will be sufficient to carry the mold parts backwardly to the initial position, that is, to the elevated position. Preferably the operator will start this movement by pushing backwardly to a slight degree on the guide-rods 16. As the operator presses backwardly on the said guide rods, pressure on the jointed levers is released at the point 35 and the stripper back will then move downwardly to its proper position by gravity. Since the stripper back does not have to travel as far as the outer ends of the end doors, it will reach its position before the doors reach their position, and finally, as the mold swings backwardly and upwardly, the end doors are closed inwardly by any desired means, either by hand or otherwise against the ends of the stripper back, so as to prevent the stripper back from again moving outwardly and to hold it in proper relation to the other parts of the mold, so that now the mold is in its initial or receiving position and is locked therein by moving the latch arms until their outer edges just engage the doors. It will thus be seen that gravity raises the mold upwardly to receiving position as well as operates the machine, after a block has been made, to lower the mold to a receiving position.

From the foregoing description, in connection with the accompanying drawings, it will be seen that we have provided an efficient gravity actuated concrete block molding machine in which the levers 8 work entirely independent of their extension members 8ª, when the machine is in position for making blocks, and it is desired to insert the cores or division boards, or to withdraw them horizontally, that the cores may be withdrawn at any angle from a horizontal position to a vertical position, inclusive. Furthermore, among the advantages that we secure by the herein-described construction and arrangement of the parts, may be mentioned the gain in labor and time by the automatic withdrawal of the cores, as compared with the methods usually employed.

By our invention, the entire mold and the block are maintained in the same relative position to each other, either parallel, or at right angles from the time the machine is ready to receive its facing, until the block is made. When the cores are pulled, and the stripper back lifted from the block, the cores are still at right angles to the face of the block, all parts of the machine work harmoniously and have a symmetrical arrangement, thereby insuring a perfect product at each operation of the machine and enabling the machine to be operated with ease. As the division boards are clamped to the core back and withdrawn by the machine, and inserted by the levers without the necessity of touching or placing them in position by hand, it is obvious that a true division is insured. The machine is automatic in its action throughout, the operator unconsciously furnishing the power to operate the machine when he shovels in the material, and after that, the principal force required of the operator is merely the placing of his foot upon the releasing lever and possibly some little assistance in returning the machine to the molding position. As the joint between the end doors and the stripper back is a beveled one, as best seen in Fig. 12, it is obvious that the doors will begin to open as soon as the stripper back starts to leave the block, thereby insuring that the doors will fall open by gravity, clear away from the ends of the block. The same lever that is used for releasing the machine when the block is finished is also used for releasing the machine when permitting it to move back to the position after the block has been delivered, a slight pressure of the operator's foot being all that is necessary during both operations.

In the foregoing, we have described the action of the weights in the movements of the levers, but our invention is not limited to the use of the weights. By reference to Figs. 2, and 3, it will be seen that when the machine is ready to receive the facing, second, when the block is completed, and third, when the block is delivered, the weights rest upon the floor or foundation, and that the pivot centers 34 of the links 33 are at the same points while the machine is in these three positions, and always so when the weights are upon the floor. Hence, when the weights are not employed, the points 34 constitute a fixed pivot center and may be embodied with the supporting legs 2. By using this arrangement, a somewhat quicker action of the machine may be obtained, as the downward travel of the weights to open the mold is saved. By the time the block is turned over, it is evident that the cores will be pulled, the block delivered, and all parts of the machine in the open position, the block is delivered in a different manner, but within the purview of the invention, as the shafts 32 may be caused to strike the upright legs 2, and thereby move the carriage outwardly the desired distance. In this arrangement, the block pulls away from the cores by its own weight, just as in the first described arrangement, but in either case the end doors do not open, until the cores are wholly out of the block. In this modified arrangement, the adjustable dogs are removed, and the cores pulled or withdrawn, just as soon as the block commences to turn, the cores or division boards continuing their relative travel until they have reached the desired limit. In closing the machine, the same action occurs exactly as described as when the weights are used. The weights are necessary only when it is desired to automatically withdraw the cores only part way when the block is turning over, or to automatically withdraw them vertically after the block has been turned clear over.

It will be understood that the division boards are automatically withdrawn the same as the cores, or all inserted as a unit with the cores. Figs. 13, 14 and 15 illustrate several embodiments of the cores and division boards. In Fig. 13, it will be seen that the division boards are formed in one piece with the cores and are provided with ears by which they may be bolted to the core-back. Fig. 14 illustrates the arrangement of parts where a core is not used, showing the division board itself formed with attaching ears which may be secured to the core-back. Fig. 15 shows an arrangement like Fig. 13, except only a half core is used in connection with the division board. Manifestly the division board may be secured to the cores in any desired way. By such arrangement, the small blocks are cored out as well as the larger ones.

Having thus described the invention, what is claimed as new is:

1. In a machine of the character described, the combination of a tiltable mold supporting frame, a stand therefor, a mold embodying separable parts mounted on said frame and arranged to move from an elevated receiving position to a lowered delivering position by the action of gravity, and means for automatically opening the parts of the mold.

2. In a machine of the character described, the combination of a tiltable mold supporting frame, a stand therefor, a mold embodying separable parts mounted on said frame and arranged to move from an elevated receiving position to a lowered delivering position by the action of gravity, and means for automatically opening, by the action of gravity, the parts of the mold.

3. A molding machine, comprising a stand, a mold supporting frame mounted to tilt on said stand, a mold mounted on said stand, a mold mounted on said frame and embodying separable parts and a core-back, cores or the like secured to said core-back, the frame being arranged to tilt by gravity so as to carry the mold from an elevated receiving position to a lowered delivering position, means for automatically withdrawing the cores and core-back from the remaining parts of the mold during such movement, and means for opening such remaining parts of the mold.

4. In a molding machine, the combination of a stand, a mold supporting frame mounted to tilt on said stand, a mold supported on said frame and embodying separable parts including a core-back and cores carried thereby, the frame being arranged to support the mold elevated in receiving position and to lower the mold to a delivering position, means for automatically stripping the core back and cores from the mold during the movement of the mold from the receiving position to delivering position, and means for automatically limiting the stripping movement to a predetermined point.

5. In a molding machine, the combination of a stand, a mold supporting frame mounted to tilt on said stand, a mold supported on said frame and embodying separable parts including a core back and cores carried thereby, the frame being designed to hold said mold elevated in receiving position and to carry the mold downwardly to delivering position, means for effecting an independent movement of the mold relative to its core back during such movement, and means for varying the amount of such independent movement.

6. In a molding machine, the combination of a stand, a mold supporting frame mounted to tilt on said stand about a horizontal axis, a mold supported on said frame at one side of said axis, counterbalancing mechanism connected to said frame at the other side of said axis, means for locking the mold supporting member with the mold elevated in receiving position, means for releasing such holding means to permit the mold supporting member to be tilted so as to carry the mold downwardly to delivering position, a connection between said counterbalancing mechanism and the mold members and arranged to effect, by gravity, the complete opening of the mold after it has been moved to the delivering position, and means carried by said releasing means for automatically holding the mold supporting frame with the mold in delivering position.

7. In a molding machine, the combination of a stand, a mold supporting frame mounted to tilt on said stand about a horizontal axis, a mold supported on said frame at one side of said axis, counterbalancing mechanism connected to said frame at the other side of said axis, means for locking the frame with the mold in elevated receiving position, means for releasing such locking means, means for tilting the mold supporting frame in the direction to carry the mold downwardly to a delivering position, means for opening the mold, said releasing means being provided with means for holding the mold supporting frame with the mold in delivering position, and means whereby the counterbalancing mechanism will return the mold supporting frame to its initial position so as to again elevate the mold upon a second actuation of the said releasing means.

8. In a molding machine, the combination of a stand, a mold supporting frame mounted on said stand, a mold supported on said frame and embodying separable members including end doors and a core-back, a hand lever fulcrumed on said frame and operatively connected to said core-back to move the same towards and from the other parts of the mold, and latch arms secured to said core-back and arranged to embrace the doors to lock the same in closed position.

9. In a molding machine, the combination of a stand, a mold supporting frame mounted thereon, a mold supported on said frame and embodying separable members including a core-back, means for moving said core-back towards and from the other parts of the mold, said mold members also including outwardly opening doors, said doors being provided with flanges, and latch arms secured to the ends of the core-back and designed to embrace said doors, said latch arms being provided with rollers arranged to ride upon and bear against the said flanges.

10. In a molding machine, the combination of a stand, a mold supporting frame mounted thereon, a mold supported on said frame and embodying separable members including a core-back and cores carried by said core-back and also including outwardly opening end doors, said doors being provided with flanges, means for moving said core-back towards and from the other parts of the mold, and latch arms secured to and carried by the ends of said core-back and provided with rollers bearing against said flanges, the relation of said latch arms and their rollers and said flanges and cores being such as to maintain the engagement of the rollers and flanges of the doors, upon the outward movement of the core-back until the said cores are withdrawn entirely from the mold.

11. In a molding machine, the combination of a stand, a mold supporting frame mounted to tilt upon said stand, a mold supported on said frame and embodying separable members including a core-back, hand levers fulcrumed on said frame and operatively connected to said core-back to move the same towards and from the other members of the mold, extension lever members also fulcrumed on said frame and arranged to be moved by the first named levers, means for permitting a limited independent movement of the first named levers relative to the other extension lever members, counterbalancing arms supports therefor, a connection between said counterbalancing arms and said extension lever members, said frame being arranged to tilt in a direction to lower the mold and rock the levers and their extension members and effect the raising of the counterbalancing arms, means for opening the mold, and means whereby the mold in open condition will be carried backwardly to its upper position by said counterbalancing arms subsequent to the opening operation.

12. In a molding machine, the combination of a stand, a mold supporting frame mounted to tilt on said stand about a horizontal axis, a mold supported on said frame at one side of said axis and embodying separable members, counterbalancing arms connected to said frame at the opposite side of said axis, the parts being arranged to raise the counterbalancing arms when the frame is tilted in a direction to carry the mold downwardly, and means effected by the weight and downward movement of said counterbalancing arms for opening the mold.

13. In a molding machine, the combination of a stand, a mold supporting frame mounted intermediate of its ends on said stand to tilt about a horizontal axis, a mold supported on said frame and embodying a pallet, end doors and a face plate located on one side of said axis, and also including a stripper back and a core-back adapted to be initially supported on the frame on the opposite side of said axis, means for moving said core-back and stripper back to the other parts of the mold and for tilting the frame on its axis in a direction to lower the mold, and means for automatically raising the core-back and stripper back relatively to the other parts of the mold, about the axis of the frame, subsequent to the tilting of the frame, whereby the weight of said core-back and stripper back and their related parts will be exerted in a direction to move the frame back to its initial position.

14. In a molding machine, the combination of a stand, a mold supporting frame mounted to tilt on said stand about a horizontal axis, a mold supported on said frame, means for moving the frame in a direction to carry the mold from an elevated receiving position to a lowered delivering position, said mold including an outwardly movable pallet supporting carriage and supports for said carriage, means for opening the mold, and means for automatically moving said carriage outwardly with the pallet on it subsequent to the opening of the mold.

15. In a molding machine, the combination of a stand, a mold supporting frame mounted on said stand to tilt about a horizontal axis, a mold supported on said frame, means for tilting said frame in a direction to carry the mold from an elevated receiving position to a lowered delivering position, said mold including an outwardly movable pallet supporting carriage, and supports for such carriage, crank arms secured to said axis and operatively connected to said carriage, means for opening the mold, and automatic means for turning the axis in a direction to move the carriage outwardly at the completion of the opening movement, said mold opening means being also arranged to actuate the carriage moving means.

16. In a molding machine, the combination of a stand, a mold supporting frame mounted on said stand to tilt about a horizontal axis, a mold supported on said frame, means for tilting the frame in a direction to move the mold from an elevated receiving position to a lowered delivering position, said mold including an outwardly movable pallet supporting carriage, crank arms connected to said axis and movable therein, pitmen connecting said crank arms to said carriage, counterbalancing arms pivotally mounted on said axis, and arranged to open the mold, and tappet arms secured to said axis and arranged to be engaged by said counterbalancing arms at the completion of their mold opening movement, whereby to slide the carriage outwardly.

17. In a molding machine, the combination of a stand, a mold supporting frame mounted on said stand to tilt about a horizontal axis, a mold supported on said frame, means for tilting the frame in a direction to move the mold from an elevated receiving position to a lowered delivering position, said mold including an outwardly movable pallet supporting carriage, crank arms connected to said axis and movable therewith, pitmen connecting said crank arms to said carriage, counterbalancing arms pivotally mounted on said axis, and arranged to open the mold, and tappet arms secured to said axis and provided with lugs and with set screws in said lugs adapted to be engaged by said counterbalancing arms at the completion of their mold opening movement, whereby to turn the axis and slide the carriage outwardly.

18. In a molding machine, the combination of a stand, a mold supporting frame mounted to tilt on said stand about a horizontal axis, a mold supported on said frame and adapted to tilt the frame by gravity in a direction to carry the mold downwardly, struts suspended from said frame and adapted to engage the stand whereby to hold the frame locked with the mold elevated, trip arms arranged to release the struts from the stand, a releasing lever operatively connected to said trips, and means for opening the mold.

19. In a molding machine, the combination of a stand, a mold supporting frame mounted to tilt thereon about a horizontal axis, a mold supported on said frame and arranged to tilt the frame by gravity, struts suspended from the mold ends of the frame and adapted to engage the stand to lock the frame from tilting, trips adapted to release the struts from the stand, a releasing lever operatively connected to said trips and removably fulcrumed on a portion of the stand, and means for opening the mold.

20. In a molding machine, the combination of a stand, a mold supporting frame mounted to tilt on said stand about a horizontal axis, a mold mounted on said frame and embodying separable members, means for locking the frame against a tilting movement, means for releasing said locking means, said releasing means including a foot treadle, means for tilting the frame in a direction to lower the mold, means for opening the mold in lowered position, and a catch carried by said foot treadle and adapted to engage the frame whereby to hold the frame locked with the mold in lowered position.

21. In a molding machine, the combination of a stand, a mold supporting frame mounted to tilt on said stand about a horizontal axis, a mold mounted on said frame and arranged to be carried thereby from an elevated receiving position to a lowered delivering position, said mold embodying separable parts including a stripper back and a core-back, means for tilting the frame in a direction to lower the mold, means for withdrawing the core-back independent of any movement of the stripper back, and means for subsequently automatically carrying the stripper back away with the core back.

22. In a molding machine, the combination of a stand, a mold supporting frame mounted to tilt on said stand, a mold supported on said frame and arranged to be carried thereby from an elevated receiving position to a lowered delivering position, the said mold embodying separable parts including a stripper back and a core-back, slidable towards and away from the other parts of the mold, stirrups connected to the ends of the stripper back, guide rods connected to the core-back, and movable through said stirrups, the core-back being arranged to abut against said stirrups to limit the independent movement of the core-back relative to the stripper back, and means for drawing the core-back away from the other parts of the mold, whereby during its movement, it will engage the stirrups of the stripper back and carry the latter away with it.

23. In a molding machine, the combination of a stand, a mold supporting frame mounted to tilt on said stand about a horizontal axis, a mold mounted on said frame and arranged to be carried thereby from an elevated receiving position to a lowered delivering position, said mold embodying separable parts including a core-back and stripper back, the latter being provided with pivoted dogs and the former with arms designed to be engaged by said dogs, and means for tilting the frame and for permitting the mold parts, except the core-back, to strip away from the latter during the tilting of the frame, the engagement of the dogs with the arms of the core-back limiting such stripping movement.

24. A molding machine, comprising a stand, a frame mounted to tilt on said stand about a horizontal axis, a mold supported on said frame and arranged to be carried thereby from an elevated receiving position to a lowered delivering position, said mold embodying separable parts including the core-back, and the mold parts, except the core-back being arranged to draw away from the latter during the tilting movement, said mold parts also including a stripper back, stirrups secured to said stripper back and formed with a slot, and a dog adjustably mounted in said slot, ore-back being provided with a finger designed for engagement by said dog, whereby to limit the drawing away movement of the mold parts from the core-back.

25. In a molding machine, the combination of a stand, a mold supporting frame on said stand, a mold mounted on said frame and embodying separable parts including a stripper back, the stripper back being designed to move away from the other parts of the mold, such other parts including hinged doors provided with recessed free ends, the stripper back being formed with beveled ends adapted to enter said recesses, and means for drawing the stripper back outwardly from the doors, whereby the beveled joint between the stripper back and doors will tend to move said doors outwardly positively upon the movement of the stripper back outwardly.

26. In a molding machine, the combination of a stand, a mold supporting frame mounted to tilt on said stand, a mold supported on said frame and embodying separable parts including a core-back, cores, and division plates clamped to said core-back and carried thereby, the frame being arranged to support the mold elevated in receiving position and to lower the mold to a delivering position, means for automatically stripping the core-back from the mold during the movement of the mold from the receiving position to the delivering position, whereby the division plates are automatically withdrawn with the core-back, the same as the cores, means for reversing the tilting movement of the frame to carry the mold upwardly, and means for moving the core-back towards the other parts of the mold, whereby the cores and division boards will be inserted as a unit in the mold.

27. In a molding machine, the combination of a stand, a shaft supported on said stand, a mold supporting frame mounted to tilt on said shaft, a mold mounted on said frame and embodying separable parts or mold members, the frame being arranged to hold the mold elevated in receiving position, means for substantially balancing the mold when filled on said shaft, the frame being arranged to tilt by the weight of the filled mold so as to carry the mold downwardly by gravity, and means for automatically opening the mold so as to free the parts thereof from the completed product.

28. In a molding machine, the combination of a tiltable mold supporting frame, a stand therefor, a mold embodying separable parts mounted on said frame and arranged to move from an elevated receiving position to a lowered delivering position by the action of gravity, and means for automatically freeing the parts of the mold from the completed product by the said action of gravity.

29. In a molding machine, the combination of a stand, a mold supporting frame mounted to tilt upon said stand, a mold supported on said frame and embodying separable parts including a core-back and cores carried thereby, the frame being arranged to support the mold elevated in receiving position and to lower the mold to the delivering position, and means for automatically stripping the core-back and cores from the mold during the movement of the mold from the receiving position to the delivering position.

In testimony whereof we affix our signatures in presence of two witnesses.

RUSSELL B. BENNETT. [L. S.]
WILLIAM W. BENNETT. [L. S.]

Witnesses:
N. V. BENNETT,
G. H. BENNETT